(12) United States Patent
Kojima et al.

(10) Patent No.: US 10,996,400 B2
(45) Date of Patent: May 4, 2021

(54) OPTICAL WAVEGUIDE INTERFEROMETER

(71) Applicants: Mitsubishi Electric Research Laboratories, Inc., Cambridge, MA (US); Mitsubishi Electric Corporation, Tokyo (JP)

(72) Inventors: Keisuke Kojima, Weston, MA (US); Bingnan Wang, Belmont, MA (US); Toshiaki Koike-Akino, Saugus, MA (US); Koichi Akiyama, Tokyo (JP); Eiji Yagyu, Tokyo (JP); Satoshi Nishikawa, Tokyo (JP); Kosuke Shinohara, Tokyo (JP)

(73) Assignees: Mitsubishi Electric Research Laboratories, Inc., Cambridge, MA (US); Mitsubishi Electric Corporation

(*) Notice: Subject to any disclaimer, the term of this patent is extended or adjusted under 35 U.S.C. 154(b) by 0 days.

(21) Appl. No.: 15/228,123

(22) Filed: Aug. 4, 2016

(65) Prior Publication Data

US 2018/0039025 A1 Feb. 8, 2018

(51) Int. Cl.
*G02B 6/293* (2006.01)
*G02B 6/12* (2006.01)
(Continued)

(52) U.S. Cl.
CPC ......... *G02B 6/29394* (2013.01); *G02B 6/125* (2013.01); *G02B 6/12011* (2013.01);
(Continued)

(58) Field of Classification Search
CPC ............ G02B 6/29394; G02B 6/29352; G02B 6/12011
See application file for complete search history.

(56) References Cited

U.S. PATENT DOCUMENTS 4,900,112 A * 2/1990 Kawachi ................ G02B 6/105
385/130
6,757,454 B2 6/2004 Inoue et al.
(Continued)

FOREIGN PATENT DOCUMENTS

CN 1952708 4/2007
CN 102859408 1/2013
(Continued)

OTHER PUBLICATIONS

K. Watanabe et al., "Trimming of InP-based Mach-Zehnder interferometer filling side cladding of high-mesa waveguide with resin," Electronic Letters, vol. 47, p. 1245, 2011.

*Primary Examiner* — Chris H Chu
(74) *Attorney, Agent, or Firm* — Hironori Tsukamoto; Gennadiy Vinokur

(57) ABSTRACT

An optical waveguide interferometer that includes a first optical section, a second optical section, and a set of optical waveguides configured to connect the first and second optical sections, such that light propagating between the first optical section and the second optical section passes through each optical waveguide in the set, wherein the set of optical waveguides includes a first optical waveguide having a first length and a first width and a second optical waveguide having a second length and a second width, wherein the second length is greater than the first length, and the second width is greater than the first width.

17 Claims, 13 Drawing Sheets

(51) Int. Cl.
  *G02B 6/122*   (2006.01)
  *G02B 6/125*   (2006.01)
  *G02B 6/13*    (2006.01)
  *G02B 6/136*   (2006.01)

(52) U.S. Cl.
  CPC ....... *G02B 6/12016* (2013.01); *G02B 6/1228* (2013.01); *G02B 6/131* (2013.01); *G02B 6/136* (2013.01); *G02B 6/29344* (2013.01); *G02B 6/29352* (2013.01)

(56) References Cited

U.S. PATENT DOCUMENTS

| | | | |
|---|---|---|---|
| 7,272,279 B2 * | 9/2007 | Ishikawa | G02B 6/125 385/39 |
| 2005/0129363 A1 | 6/2005 | McGreer | |
| 2006/0120657 A1 * | 6/2006 | Little | B82Y 20/00 385/11 |
| 2007/0086704 A1 | 4/2007 | Ishikawa et al. | |
| 2013/0101249 A1 * | 4/2013 | Doerr | G02B 6/12011 385/14 |

FOREIGN PATENT DOCUMENTS

| | | |
|---|---|---|
| JP | H06308338 | 11/1994 |
| JP | 2002107681 | 4/2002 |
| JP | 2012133404 | 7/2012 |
| JP | 2013507660 | 3/2013 |
| JP | 2016114763 | 6/2016 |

\* cited by examiner

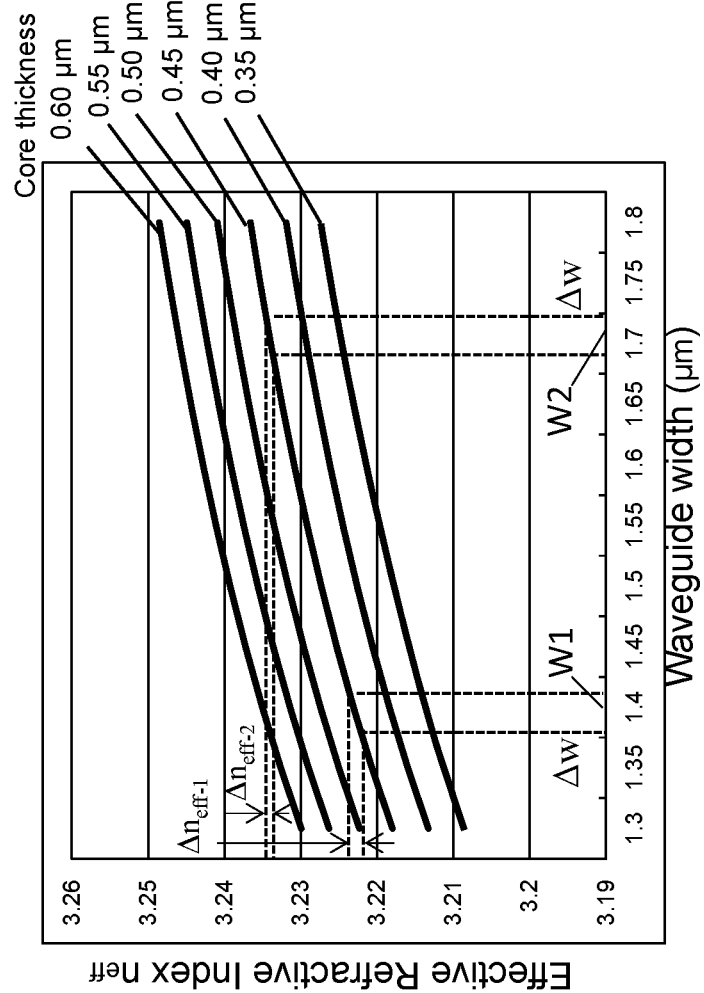
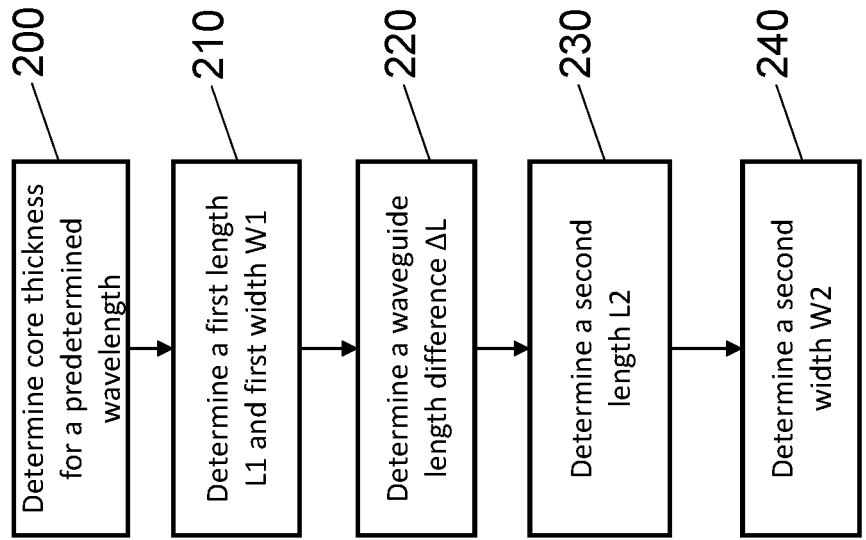
FIG. 2B
FIG. 2A

OPTICAL WAVEGUIDE INTERFEROMETER

FIELD OF THE INVENTION

This invention relates to an optical waveguide interferometer and a manufacturing method of the optical waveguide interferometer, and more specifically, a phase-shift compensation optical waveguide interferometer and a manufacturing method thereof.

BACKGROUND OF THE INVENTION

In the optical Ethernet standards (100 Gb/s, 400 Gb/s, for example), closely aligned multiple wavelengths are being used. Wavelength multiplexing is done in a planar lightwave circuit (PLC)-based wavelength combiner, using 4-8 electro-absorption modulator integrated lasers (EMLs). However, the packaging process of the PLC-based wavelength combiner is very expensive because time consuming processes including many active alignment processes between EMLs and PLC chips are necessary. In order to reduce a manufacturing cost of the PLC-based wavelength combiner, the combination of multiple wavelengths on a InP-based PIC and reduction of the number of couplings between the PICs and PLC would be an effective approach.

One of the ways to combine, split or otherwise manipulate optical signals is to use power couplers having no wavelength dependences. An example of such a device is a multimode interference (MMI) device. However, such MMI devices have losses. For example, when two, four, and eight signals are coupled, the intrinsic insertion losses become 3 dB, 6 dB, and 9 dB, respectively.

An alternative method for optical signal manipulation uses wavelength selective combiners, such as asymmetric optical interferometers, e.g., asymmetric Mach-Zhender interferometer or an arrayed waveguide grating (AWG). In these devices, there is no intrinsic loss, and even though some losses exist due to waveguide losses and small coupling/splitting loss, the amount of losses is much smaller than the intrinsic loss of the power coupler.

However, the wavelength selective manipulators are sensitive to wavelength variation introduced by the fluctuation of the manufacturing process. A change in waveguide width leads a change in the effective refractive index, or change in phase when a light-wave enters to a second MMI. Due to specifics, scale and precision of manufacturing the photonic integrated circuits, it is difficult to control the widths of the waveguide precisely. However, due to the dimensions of waveguides, even a minor variation of the width can be significant in relative terms. For example, variations for width of 1.4 microns of the waveguide can be variation of 5% of the width of the waveguide, which cause large wavelength shift from design.

Number, of methods addresses this problem by manually tuning the fabricated waveguides. For example, the method described in K. Watanabe et al., "Trimming of InP-based Mach-Zehnder interferometer filling side cladding of high-mesa waveguide with resin," Electronic Letters, vol. 47, p. 1245, 2011, uses trimming to tune the wavelength of a Mach-Zehnder interferometer, using material with different refractive index surrounding the waveguide to change the effective refractive index in one of the waveguide. This method requires measurement of wavelength characteristics of each interferometer, and trimming each device one by one, adding packaging cost and time. Accordingly, there is a need to reduce dependencies of the wavelength characteristics of an interferometer on the precision of the fabrication process.

SUMMARY OF THE INVENTION

Some embodiments are based on recognition that asymmetric interferometers include optical waveguides of different lengths, and the same error in width control for different waveguides have different effect on the phases of wavelengths due to different lengths of the waveguides. Specifically, the same width error causes the phase shift difference between the waveguides of different lengths.

Some embodiments are based on realization that the phase shift difference is not only function of the length of the waveguides, but also function of width of the waveguides. For example, the effective refractive index of an optical waveguide is sensitive to the change of its width. Moreover, this sensitivity is a function of the width. Specifically, the wider the waveguide, the sensitivity of effective refractive index against the waveguide width variation gradually goes down. To that end, some embodiments select a combination of different lengths and widths of the waveguides such that a uniform modification of the widths of the waveguides avoids or at least minimizes the creation of the phase shift difference.

Accordingly, one embodiment discloses an optical waveguide interferometer, including a first optical section; a second optical section; and a set of optical waveguides connecting the first optical section and the second optical section, such that light propagating between the first optical section and the second optical section passes through each optical waveguide in the set. The set of optical waveguides includes a first optical waveguide having a first length and a first width and a second optical waveguide having a second length and a second width, wherein the second length is greater than the first length, and the second width is greater than the first width.

Another embodiment discloses a method for manufacturing an optical waveguide interferometer. The method includes providing a multilayer grown indium phosphide (InP) substrate, wherein the multilayer grown substrate includes a first InP layer having a first predetermined thickness, an indium-gallium-arsenide-phosphide (InGaAsP) layer having a predetermined core thickness, and a second InP layer having a second predetermined thickness of 0.3-2.5 μm; forming photo-resist masks on the capping layer, wherein the masks are designed to have a first length and a second length and a first width and a second width, wherein the second length is greater than the first length and the second width is greater than the first width; and performing an etching process to form predetermined grooves having a predetermined depth d from a bottom of the InGaAsP layer.

BRIEF DESCRIPTION OF THE DRAWINGS

FIG. 2A is a plot indicating a relationship between effective refractive indexes of waveguides and waveguide widths for different core thicknesses;

FIG. 2B is a block diagram of a method for determining dimensions of an optical waveguide interferometer that includes different lengths and different widths according to some embodiments;

DETAILED DESCRIPTION OF THE PREFERRED EMBODIMENTS

Figure 1:
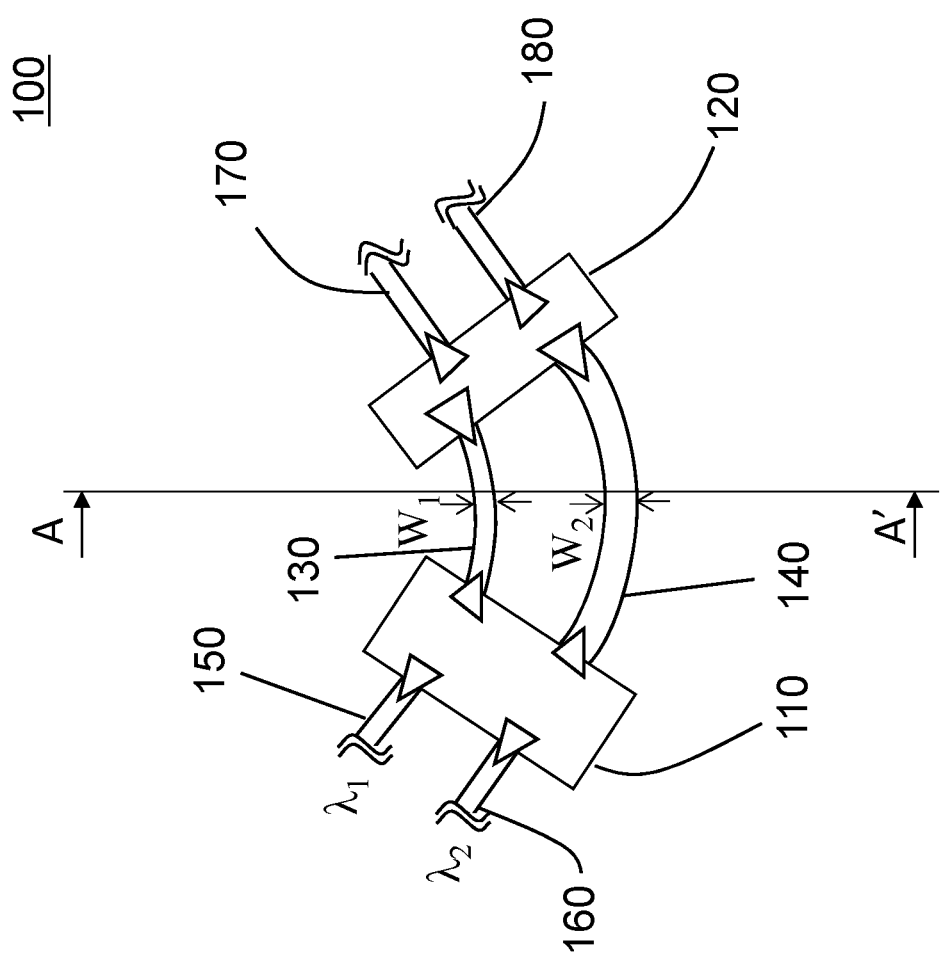
FIG. 1 is a plan view of an optical waveguide interferometer of an embodiment.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1 shows a plan view of an optical waveguide interferometer 100 according to one embodiment. The optical waveguide interferometer 100 includes a first optical section 110 and a second optical section 120. Examples of the optical sections include branching, coupling, and splitting sections. For example, the first optical section can be a branching section including at least one branch-input port 150 and/or 160 for accepting the light into the branching section 110 and at least two branch-output ports for outputting the light from the branching section, and the second optical section 120 can be an optical coupling section including at least two coupling-input ports for accepting the light into the coupling section and at least one coupling-output port for outputting the light from the coupling section.

The optical waveguide interferometer 100 also includes a set of waveguides connecting the first optical section 110 and the second optical section 120, such that light propagating between the first optical section 110 and the second optical section (120) passes through each optical waveguide in the set. In this example, the set of the waveguides includes two waveguides a first optical waveguide 130 and a second optical waveguide 140; however, other embodiments include different number of waveguides. The first optical waveguide 130 has a first length and a first width. The second optical waveguide 140 has a second length and a second width selected such that the second length is greater than the first length, and the second width is greater than the first width.

In some embodiments, optical waveguides 150 and 160 are connected to input portions of the first optical section 110 for accepting the light into the first optical section 110. One side of the waveguides 130 and 140 are connected to output portions of the branching section 110 and another side of the waveguides 130 and 140 are connected to input portions of the second optical section 120, respectively. Output portions of the second optical section 120 are connected to optical output waveguides 170 and 180. The optical output waveguides 170 and 180 may be connected to optical fibers or optical waveguides. Optical signals with different wavelengths $\lambda_1$ and $\lambda_2$, propagating the optical input waveguides 150 and 160, respectively, are input to the input sections of the branching section 110 via the optical input waveguides 150 and 160. After passing the branching section 110, and the waveguides 130 and 140 and the second optical section 120, the optical signals are output from the output portions of the second optical section 120 to the optical output waveguides 170 and 180. In the present embodiment, although a circuit configuration of 2×2 optical input/output waveguides and two interconnecting waveguides configuration is shown as an example, the number of input/output waveguides and the number of the waveguides may be changed according to the optical circuit design. The input portion and the output portion described above may be referred to an input port and an output port, respectively.

Some embodiments of the invention are based on recognition and appreciation of the fact that an effective refractive index of a waveguide changes with a waveguide width. This indicates that when the waveguide width fluctuates by $\Delta w$ as a result of manufacturing process fluctuation, the effective refractive index fluctuates by $\Delta n_{eff}$ as well. In other words, the effective refractive index of the waveguide is as a function of an average of waveguide width fluctuations over the waveguide length.

FIG. 2A shows the relationship between the effective refractive indexes and waveguide widths at different core thicknesses of the waveguides. The effective refractive index of a waveguide increases with a waveguide width at a core thicknesses. For a constant core thickness, as shown in FIG. 2A, the amount of each slope changes from great to gentle with increase in waveguide width. This indicates that a wider waveguide would offer smaller change in the waveguide width. In other words, the wider waveguide is more insensitive to the manufacturing process fluctuations compared to the narrower waveguide with respect to the effective refraction index. For example, the same variations Δw for the waveguides of different widths W1 and W2 results in different change of the effective refractive index $\Delta n_{\textit{eff-}1}$ and $\Delta n_{\textit{eff-}2}$.

When an effective refractive index deviates from a predesigned value as a result of manufacturing fluctuations, the phase of a light-wave (optical signal) propagating the waveguide shifts according to the refractive index deviation at the output side of the waveguide. In this case, when two optical signals propagating two waveguides, a relative phase difference between the two optical signals is caused at output sides of the waveguides. The relative phase difference Δφ between the two optical signals is written as follows.

$$\Delta \varphi = (L_1 \cdot \Delta n_{\textit{eff-}1} - L_2 \cdot \Delta n_{\textit{eff-}2}) \cdot 2\pi/\lambda, \quad (1)$$

where $L_1$ is a length of a first waveguide, $L_2$ is a length of a second waveguide, $\Delta n_{\textit{eff-}1}$ is a fluctuation value of an effective refractive index deviated from a predesigned effective refractive index $n_{\textit{eff-}1}$ of the first waveguide, and $\Delta n_{\textit{eff-}2}$ is a fluctuation value of an effective refractive index deviated from a predesigned effective refractive index $n_{\textit{eff-}2}$ of the second waveguide. By taking the relative phase difference Δφ being zero in equation (1), a relative phase difference compensation condition is written as $$\Delta n_{\textit{eff-}1}/\Delta n_{\textit{eff-}2} = L_2/L_1. \quad (2)$$

In other words, when the waveguides satisfy the relation of equation (2), the relative phase difference caused between the first and second waveguides can be compensated to zero. To satisfy equation (2), when $L_2$ is greater than $L_1$ ($L_2 > L_1$), $\Delta n_{\textit{eff-}1}$ may be greater than $\Delta n_{\textit{eff-}2}$. For example, the effective refractive index fluctuations $\Delta n_{\textit{eff-}1}$ and $\Delta n_{\textit{eff-}2}$ with a 0.45 μm core thickness for a waveguide width fluctuation Δw are schematically illustrated at different width regions in FIG. 2. This indicates that a slope $\Delta n_{\textit{eff-}1}/\Delta w$ at a narrower waveguide width is greater than that of a slope $\Delta n_{\textit{eff-}2}/\Delta w$ at a wider waveguide width. This indicates that when choosing a wider waveguide with a longer wavelength, the relative phase difference can be effectively reduced.

In FIG. 2A, as the amount of each slope changes from great to gentle with increase in waveguide width as discussed above, $\Delta n_{\textit{eff-}1}$ may be applied to a region indicating greater slopes corresponding $L_1$ and $\Delta n_{\textit{eff-}2}$ may be applied to a region indicating gentle slopes corresponding to $L_2$. To that end, the waveguides of the interferometer 100 have not only different lengths but also different widths.

As an example in FIG. 1, the optical interferometer 100 includes the first optical section 110, the second optical section 120 and the set of optical waveguides 130 and 140. The waveguide 130 may be the first waveguide having the length $L_1$ and a width $W_1$, and the waveguide 140 may be the second waveguide having the length $L_2$ and a width $W_2$. According to the abovementioned principles, the length $L_2$ is greater than the length $L_1$ and the width $W_2$ is greater than the width $W_1$.

For example, for a core thickness of 0.45 μm, $L_1$ and $L_2$ may be 315.3 μm and 365.3 μm, and $W_1$ and $W_2$ may be 1.40 μm and 1.48 μm, respectively.

In another embodiment, the widths $W_1$ and $W_2$ may be chosen to be 1.40 μm and 1.44 μm, respectively. This combination provides effective reduction of the sensitivity of effective refractive index fluctuations due to the waveguide width fluctuations.

Some embodiments are based on recognition that such a reduction of the sensitivity of effective refractive index fluctuations can be archived when a product of the first length $L_1$ and a deviation $\Delta n_{\textit{eff-}1}$ of an effective refractive index of the first waveguide is substantially equal to a product of the second length $L_2$ and a deviation $\Delta n_{\textit{eff-}2}$ of an effective refractive index of the second waveguide.

To that end, some embodiments select the first and the second widths accordingly, using, e.g., the plot of FIG. 2A. As used herein, the substantially equal means that the difference of the products is less than 10%. In one embodiment, the difference is less than 5%.

For example, one embodiment uses the following relationship for designing the optical waveguides.

$$L_1 \cdot \Delta n_{\textit{eff-}1} = \alpha \cdot L_2 \cdot \Delta n_{\textit{eff-}2}, \text{ where } 0.9 \leq \alpha \leq 1.1 \quad (3)$$

FIG. 2B shows a block diagram of a method for determining dimensions of an optical waveguide interferometer that includes different lengths and different widths according to some embodiments of the invention. For an optical signal having a wavelength λ and predetermined material layers of the optical waveguide interferometer, a core thickness $t_c$ may be chosen from a range between 0.35 μm and 0.6 μm. A predetermined wavelength separation Δκ is also defined according to a predetermined optical communication system. In this example, it is assumed that the core thickness tc is chosen to be 0.45 μm indicated in FIG. 2A. Regarding the optical waveguide interferometer having a first waveguide and a second waveguide, a first length L1 and a first width W1 of the first waveguide are determined according to a predetermined layout of the optical waveguide interferometer.

In order to determine a second length $L_2$ ($=L_1 + \Delta L$), a waveguide length difference ΔL is determined according to the following relation.

$$\Delta L = \lambda^2/(2 \cdot n_g \cdot \Delta\lambda), \text{ where } n_g = n_{\textit{eff}} - \lambda(dn/d\lambda). \quad (4)$$

For example, when Δλ is set to be 4.48 nm for the signal wavelength at λ=1.3 μm, $n_g$ is determined according to the predetermined system to be 3.664 by assuming that $n_{\textit{eff}}$=3.243 and dn/dλ=−0.324. By using $n_g$(=3.664) into equation (4), ΔL is obtained to be 51.5 μm. Accordingly, the second length L2 can be determined by calculating L2=L1+ 51.5 μm in the present example.

After L2 is determined, the width W2 of the second waveguide can be determined by using equation (3) by refereeing FIG. 2A.

As an example, the first width W1 and second W2 are indicated in FIG. 2A.

After the first length L1 and first width W1 for a predetermined core thickness and a predetermined wavelength are determined, the second length L2 and second width W2 are obtained. The designing steps are illustrated in FIG. 2B.

FIG. 3A, FIG. 3B, FIG. 3C and FIG. 3D show example cross sections of the optical interferometer 100 indicating a view of A-A' in FIG. 1.

In different embodiments, each of the waveguides 130 and 140 is formed of an indium phosphide (InP) substrate 10 (substrate 10), an indium gallium arsenide phosphide (InGaAsP) layer 20 (core layer 20), an InP cladding layer 30 (cladding layer 30), an InP cap layer 40 (cap layer 40). The InGaAsP layer 20 may be used as a core layer of each of the waveguides 130 and 140. The core layer 20 may be in thickness approximately from 0.3 μm to 0.7 μm. The cladding layer 30 may be in thickness approximately from 0.7 to 1.2 μm. The cap layer 40 may be in thickness approximately from 0.4 μm to 0.6 μm. The InP substrate 10 includes a bottom cladding layer 50 having a thickness d. The thickness d of the bottom cladding layer 50 may be approximately identical to the thickness of the cladding layer 30. For example, when the cladding layer 30 is 0.9 µm in thickness, the bottom cladding layer 50 may be approximately 0.9 µm.

Alternately, the core layer may be an indium gallium arsenide (InGaAs) layer with approximately from 0.3 µm to 0.7 µm.

Figure 3A:
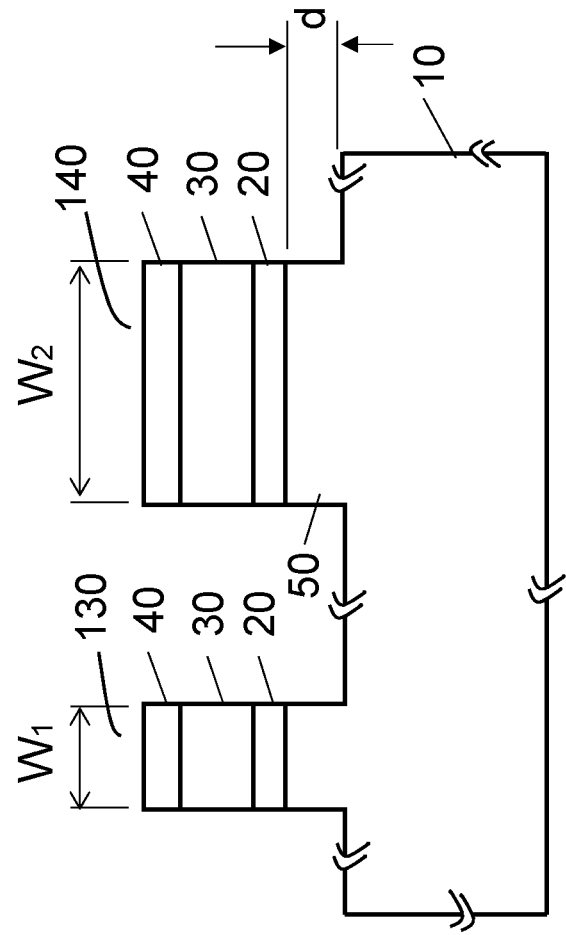
FIG. 3A is a first example of a cross-sectional view of optical waveguides having different widths according to some embodiments.
Figure 3B:
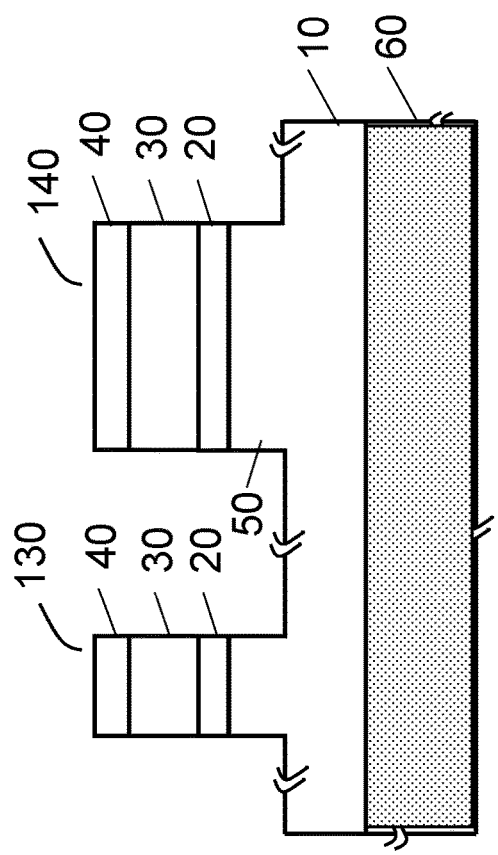
FIG. 3B is a second example of a cross-sectional view of optical waveguides having different widths according to some embodiments.
Figure 3C:
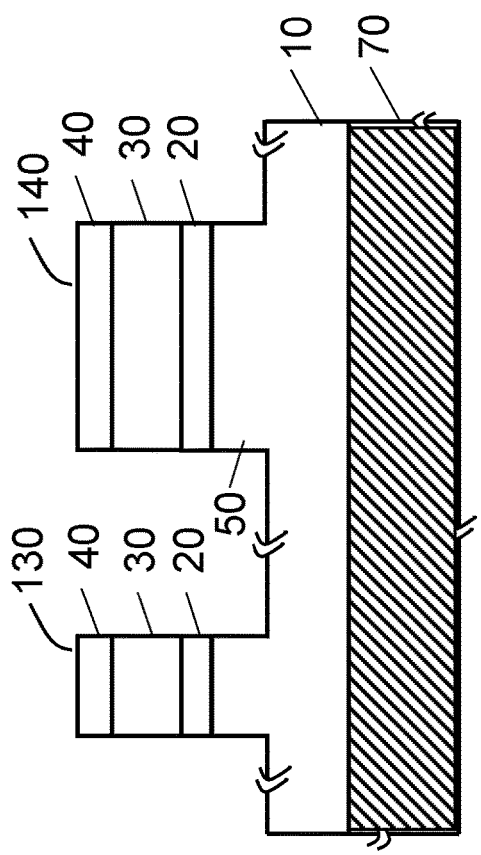
FIG. 3C is a third example of a cross-sectional view of optical waveguides having different widths according to some embodiments.

For an example, the InP substrate 10 may be mounted on a glass substrate 60, as shown in FIG. 3B. In this embodiment, the bottom of the InP substrate may be thinned and disposed on the glass substrate 60 by bonding process. For further example, the InP substrate 10 may be mounted on a silicon on insulator (SOI) substrate 70. The top of the SOI substrate is bounded to the bottom of the InP substrate 10 as shown in FIG. 3C.

Figure 3D:
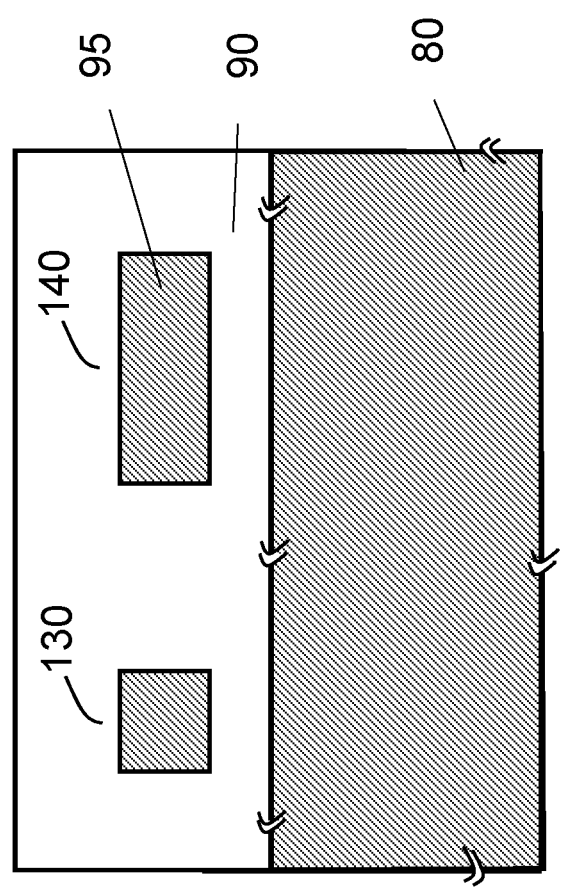
FIG. 3D shows an example of waveguides formed from silicon and silicon dioxide.

FIG. 3D shows another example of waveguides formed from silicon and silicon dioxide materials. A cross section of waveguides 130 and 140 is illustrated in FIG. 3D. The waveguides 130 and 140 are formed from silicon and silicon dioxide by use of a conventional silicon process technique. Each of the waveguides 130 and 140 is formed of a silicon wire 95 surrounded by a silicon dioxide cladding layer 90. The silicon dioxide cladding layer 90 was deposited on a silicon substrate (substrate 80). The waveguides 130 and 140 may be approximately from 0.15 µm to 0.3 µm in thickness, and from 0.2 µm to 0.6 µm in width. The distance between the silicon substrate and the silicon wire and a thickness of the silicon dioxide cladding layer 90 on the waveguides 130 and 140 may be approximately from 1.5 µm to 2.5 µm.

Figure 4A:
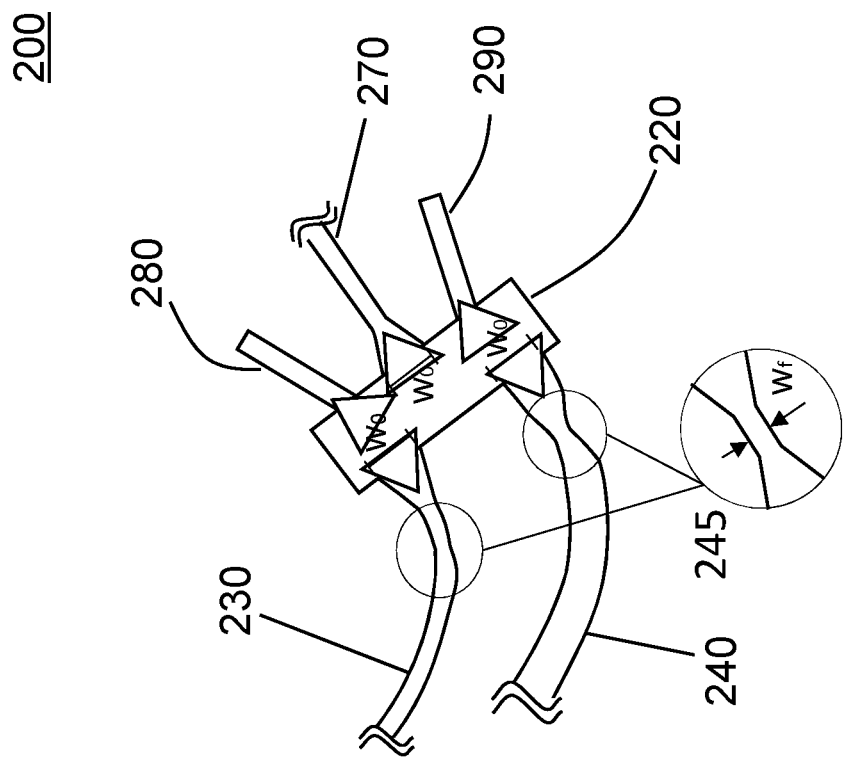
FIG. 4A is an example of an optical waveguide interferometer that includes an optical coupling section having tapered sections and unconnected waveguides according to some embodiments.

FIG. 4A illustrates an optical circuit 200 includes an optical section 220 according to another embodiment of the invention. In this embodiment, the optical section 220 may be referred to as an optical coupling section. The optical coupling section 220 includes at least one unconnected waveguides. In this embodiment, output ends of waveguides 230 and 240 are connected to input portions of the optical coupling section 220. An output waveguide 270 is connected to an output portion of the optical coupling section 220. Unconnected waveguides 280 and 290 are arranged to connect to the other output portions of the optical coupling section 220.

For example, parasitic reflections take place at the optical coupling section 220 when some amount of optical waves (optical signals) from the waveguides 230 and 240 are not input into the output waveguide 270 and reflected at the optical coupling section 220. The unconnected waveguides 280 and 290 are configured so as to effectively release the optical waves of parasitic reflections through the ends of the unconnected waveguides 280 and 290, respectively. Accordingly, the unconnected waveguides 280 and 290 are terminated such that there will be minimal reflection of the optical waves. Typical width of the input side of the unconnected waveguides 280 and 290 may be greater than 1.5 µm, and the lengths of the unconnected waveguides 280 and 290 may be between 30-70 µm.

In this embodiment, a width of the waveguide 240 may be arranged to be greater than that of the waveguide 230, and a length of the waveguide 240 may be arranged to be greater than that of the waveguide 230. Each width of the waveguides 230 and 240 may be defined by taking an average width calculated over the waveguide length. Input ends (or signal input sides) of the waveguides 230 and 240 are connected to the output portions of another optical section, such as an optical branching section (not shown).

For more options, in order to effectively guide the optical waves from the waveguides 230 and 240 into the output waveguide 270, the output waveguide 270 may include a tapered-shape having approximately a predetermined width $w_0$ at the output portion of the optical coupling section 220. The tapered-shape is configured to effective receive the optical wave from the waveguides 230 and 240 by making the input portion of the output waveguide 270 wider. It is preferable that the output ends of the waveguides 230 and 240 and the input end of the output waveguide 270 have approximately the same width $w_0$ at the input and output portions of the optical coupling section 220 to improve signal input/output characteristics, e.g. optical loss reduction, as indicated in FIG. 4A. Accordingly, the waveguides 230 and 240 may include tapered-shape portions at their output ends and input ends (not shown). The tapered-shape portion of the waveguides 230 and 240 having a width $w_0$ (maximal width $w_0$) at the output ends is shown in FIG. 4A. The width $w_0$ is chosen such that optical loss within the optical coupling section 220 becomes minimal. For InP-based waveguides, the width $w_0$ may be chosen to be 1.45-3.0 µm. The input ends of the waveguides 230 and 240 may have approximately the same shape as those of the output ends having the tapered-shape portion with a width $w_0$. The waveguide 240 having a width $w_0$ is connected to the input portion of the optical coupling section 220.

FIG. 4A shows another example in which each of the waveguides 230 and 240 includes a narrow segment 245. The narrow segments 245 are configured to allow only fundamental mode by arranging a waveguide width $w_f$. The narrow segment 245 are configured to filter out all the higher-order modes. For the case of InP-based waveguides, the width $w_f$ may be 1.0-1.4 µm. Each of the narrow segments of the waveguides 230 and 240 includes a narrowed segment. The narrow segments 245 may be formed to be at least longer than 1 µm. Each narrow segment is schematically shown in FIG. 4A. Further, the optical circuit 200 may include more than two optical coupling sections to provide an arrayed waveguide grating (AWG).

Figure 4B:
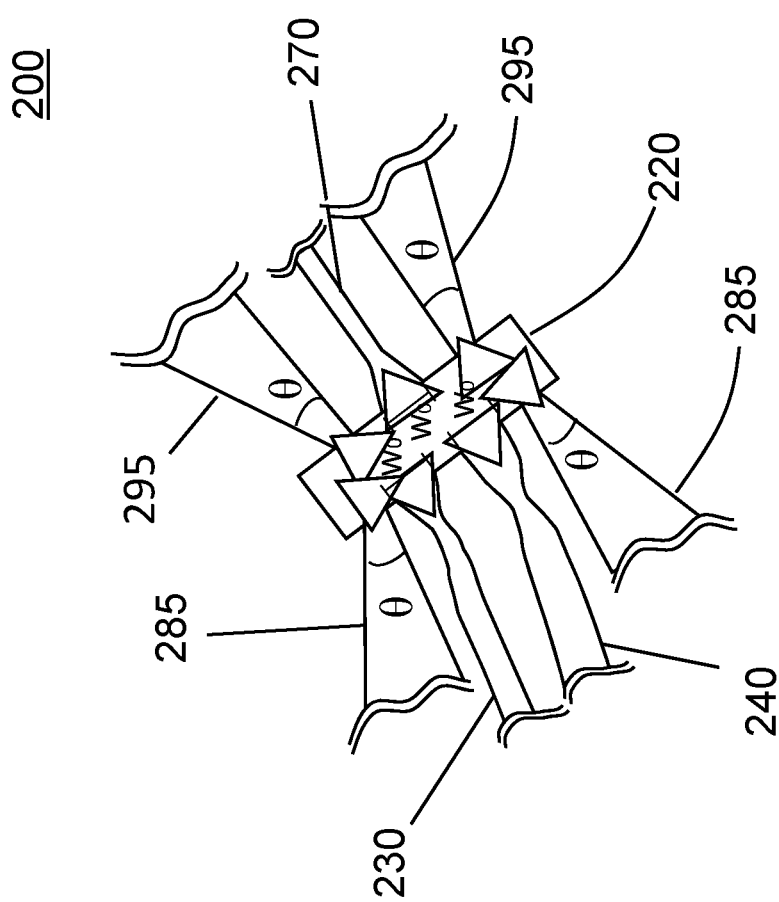
FIG. 4B is an example of an optical waveguide interferometer that includes an optical coupling section having unguided waveguides according to some embodiments.

FIG. 4B illustrates another example of an optical circuit that includes an optical coupling section having unguided waveguides. The unguided waveguides are also effective to reduce the parasitic reflections by releasing the optical waves of the parasitic reflections through the ends of the unguided waveguides. Each unguided waveguide includes a shape having a predetermined angle pattern connected to the optical coupling section. For example, unguided waveguides 285 and 295 are arranged at the input side and the output side of the coupling section 220. The unguided waveguides 285 are arranged next to the input waveguides 230 and 240, and the unguided waveguides 295 are arranged next to the output waveguide 270. The unguided waveguides 285 and 295 may be terminated with no connections, allowing release of the unwanted reflection signals from the ends of the waveguide 289 and 295. Alternatively, the ends of the unguided waveguides 285 and 295 may be terminated with light absorbing materials, such as amorphous silicon, poly silicon, carbon nanotubes, oxide-base graphene or the like. A predetermined angle θ of the unguided waveguides 285 and 295 is indicated in FIG. 4B. The predetermined angle θ may be arranged to be in range, 10°<θ<90° and lengths ranging between 20-100 µm.

Figure 5:
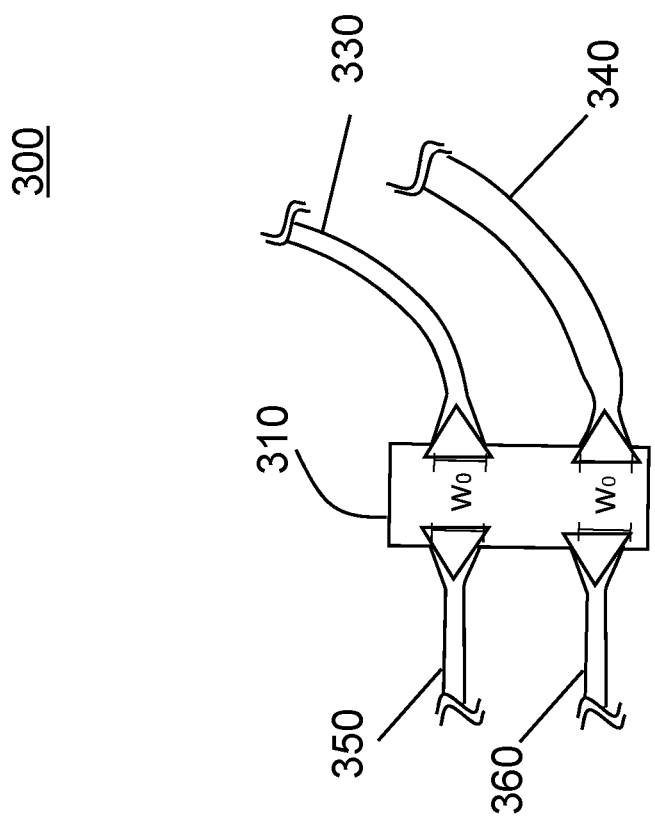
FIG. 5 is an example of an optical waveguide interferometer that includes a first optical section having waveguides with tapered sections according to some embodiments.

FIG. 5 shows a branching circuit (first optical section) 300 that includes a branching section 310 connected to input ends of waveguides 330 and 340. A width of the waveguide 340 may be arranged to be greater than that of the waveguide 330, and a length of the waveguide 340 may be arranged to be greater than that of the waveguide 330. Each width of the waveguides 330 and 340 may be determined by an average width calculated over its waveguide length.

For example, the branching section 310 may be connected to input waveguides 350 and 360 having tapered-shapes with approximately a width $w_0$ at the input portions of the branching section 310. The waveguide 330 includes a tapered-shape portion having approximately the width $w_0$ at the input end connected to the output portion of the branching section 310. The waveguides 340 has approximately the width $w_0$. Accordingly, the branching section 310 is connected to the output portions of the input waveguides 350 and 360, and is connected to the input portions of the waveguides 330 and 340, in which each of the output portions of the input waveguides 350 and 360 and the waveguides 330 and 340 have approximately the same width $w_0$ at the connected portion. See FIG. 5. The width $w_0$ may be referred to a maximum tapered width, and the width $w_0$ may be between 1.45-3.0 μm.

Figure 6A:
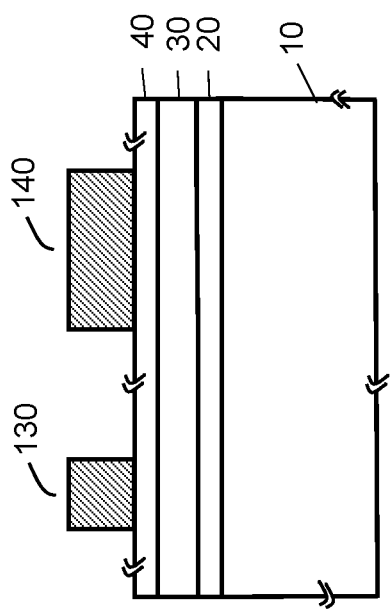
FIG. 6A is an example of one of the steps of a manufacturing process of an optical waveguide interferometer having different widths according to some embodiments.
Figure 6B:
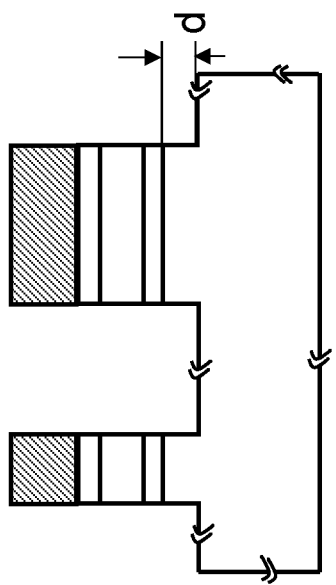
FIG. 6B is an example of another one of the steps of a manufacturing process of an optical waveguide interferometer having different widths according to some embodiments.
Figure 6C:
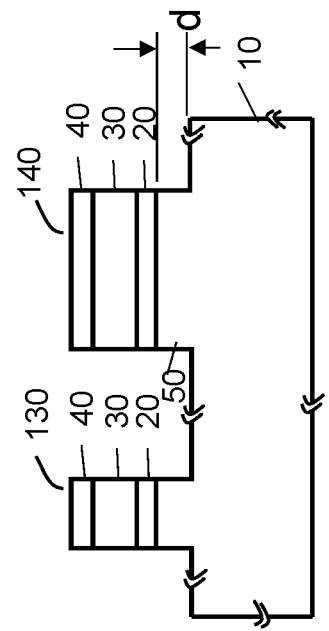
FIG. 6C is an example of a further one of the steps of a manufacturing process of an optical waveguide interferometer having different widths according to some embodiments.
Figure 7:
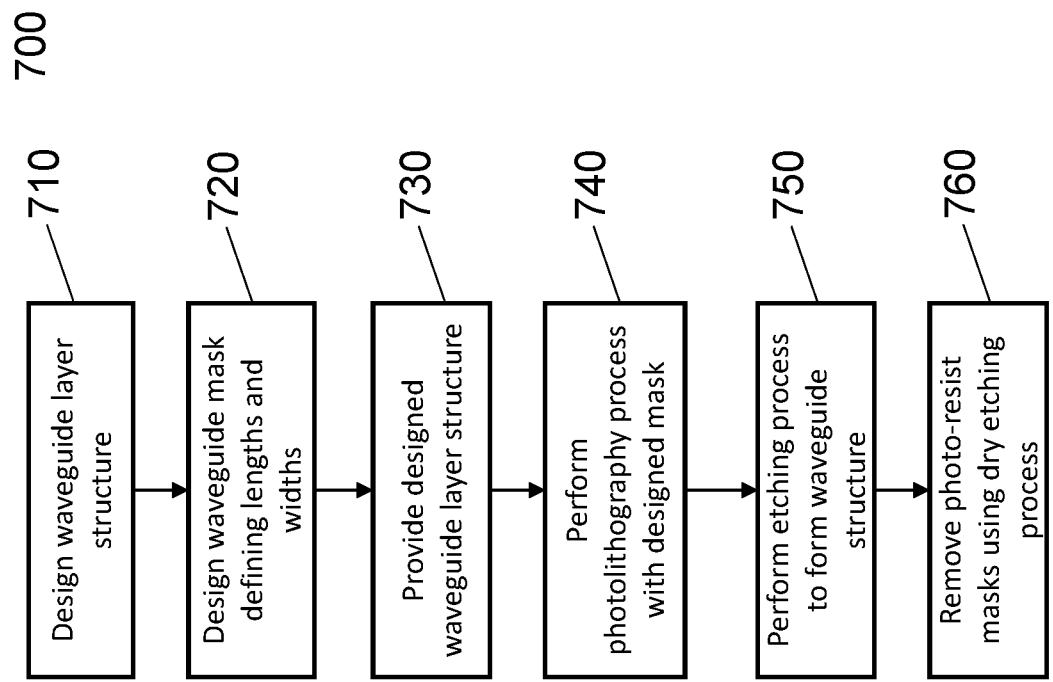
FIG. 7 is a flowchart describing the process steps of manufacturing an optical waveguide interferometer according to some embodiments.

FIGS. 6A, 6B and 6C illustrate an example of a manufacturing process of an optical waveguide interferometer 100 with a cross sectional structure shown in FIG. 3. The process flow of manufacturing the optical interferometer 100 is also illustrated in FIG. 7. The manufacturing process of the optical waveguide interferometer 100 is described below by referring FIGS. FIGS. 6A, 6B and 6C and FIG. 7.

A multiplayer grown indium phosphide (InP) substrate is used according to the design of the waveguide layer structure in step 710. The multilayer grown substrate may include a capping layer 40, a first indium phosphide (InP) layer 30 (upper cladding layer 30), an indium-gallium-arsenide-phosphide (InGaAsP) layer 20 (core layer 20) and a second InP layer 50 (lower cladding layer 50) being part of an InP substrate 10. The InGaAsP layer (core layer) 20 may be 0.3-0.7 μm, more preferably 0.45 μm. The capping layer 40 may be excluded from the waveguide structure according to the system design. The upper cladding layers 30 and the lower cladding layer 50 may be in thickness approximately from 0.7 to 1.2 μm.

In steps 720 through 740 of FIG. 7, waveguide masks 130 and 140 are formed as shown in FIG. 6A. In the photolithography process of step 740, photo-resist masks are formed on the capping layer, in which the masks are designed to have first and second lengths (see FIG. 1) and first and second widths. For example, the first length may be chosen between 314-316 μm, and the second length may be chosen between 364-366 μm. The first width may be chosen between 1.35-1.45 μm, more preferably the first width may be chosen to be 1.4 μm. The second width may be 1.46-1.5 μm, and more preferably the second width may be chosen to be 1.48 μm.

In step 750, an etching process is performed to form a waveguide structure of the optical waveguide interferometer 100 having the waveguides 130 and 140 as shown in FIG. 6B. In the etching process of step 750, a dry etching process may be performed to form the waveguides 130 and 140. In the etching process, the InP substrate 10 is also etched down to form the lower cladding layer 50. For example, a depth d may be defined as a distance from the bottom of the InGaAsP layer (core layer) to the etched surface of the InP substrate 10. The depth d may be between 0.4-0.5 μm. Alternatively, the thickness d of the bottom cladding layer 50 may be approximately identical to the thickness of the cladding layer 30. For example, when the upper cladding layer 30 is 0.9 μm in thickness, the lower cladding layer 50 may be approximately 0.9 μm.

A thickness d of the lower cladding layer 50 is indicated in FIG. 6B. After removing the resist masks in step 760, the waveguide structure of the waveguide 130 and 140 are formed. Next, in step 760, a plasma ashing process is performed to remove the resist masks and finalized the waveguide manufacturing process. It should be noted that explanations regarding the conventional process treatment such as a water rinsing process and a drying process are neglected in the process flow of FIG. 7.

Alternatively, the bottom of InP substrate may be thinned by a polishing process and bounded with a silicon substrate, as shown in FIG. 3B, which improves thermal conductivity of the optical waveguide interferometer. For another example, a silicon on insulating (SOI) substrate may be used instead of the silicon substrate as shown in FIG. 3C.

Figure 8:
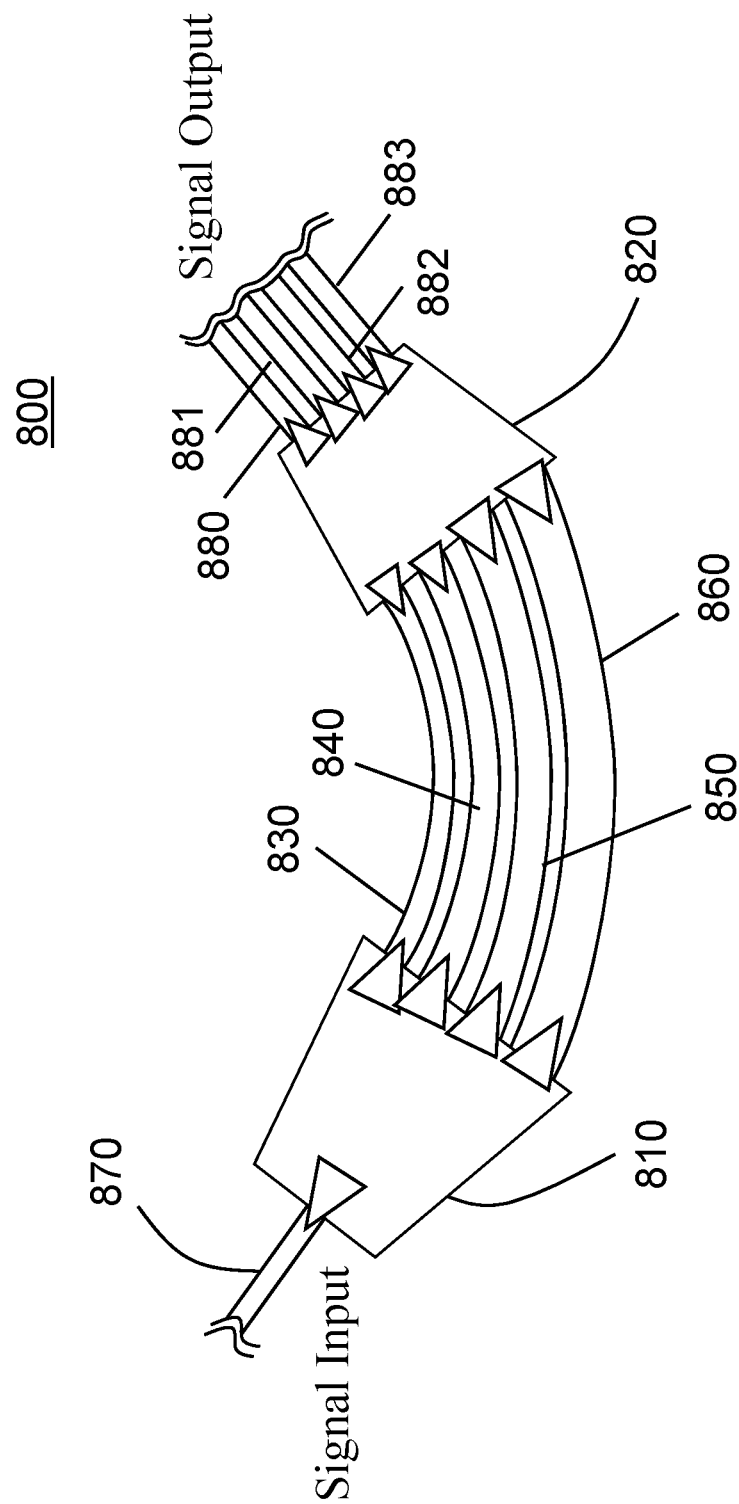
FIG. 8 is an example of an optical waveguide interferometer that includes more than two waveguides with different widths and lengths according to some embodiments.

FIG. 8 illustrates another embodiment, in which an optical waveguide interferometer 800 includes four waveguides with different widths and four output ports. There are four waveguides 830, 840, 850 and 860 arranged in the optical interferometer 800. The waveguides 830, 840, 850 and 860 have different lengths L1, L2, L3 and L4, and different widths W1, W2, W3 and W4, respectively. As is seen in FIG. 8, the lengths are arranged to be L1<L2<L3<L4, and the widths are arranged to be W1<W2<W3<W4. An optical signal is input through an input waveguide 870. The optical signal propagates through an optical branching section 810 and separated into the waveguides 830, 840, 850 and 860. After interfering by passing the waveguides 830, 840, 850 and 860, each interference signal is derived to each of output waveguides 880, 881, 882 and 883 through an optical coupling section 820 according to the system design. In this embodiment, the optical waveguide interferometer 800 may be referred to as an arrayed waveguide 800, the optical branching section may be referred to as a first optical section 810, and the optical coupling section 820 may be referred to as a second optical section 820. Although the lengths order of the waveguides 830, 840, 850 and 860 are arranged to be L1<L2<L3<L4 in this example, another configuration of the lengths of waveguides may be selected according to the system design.

Figure 9:
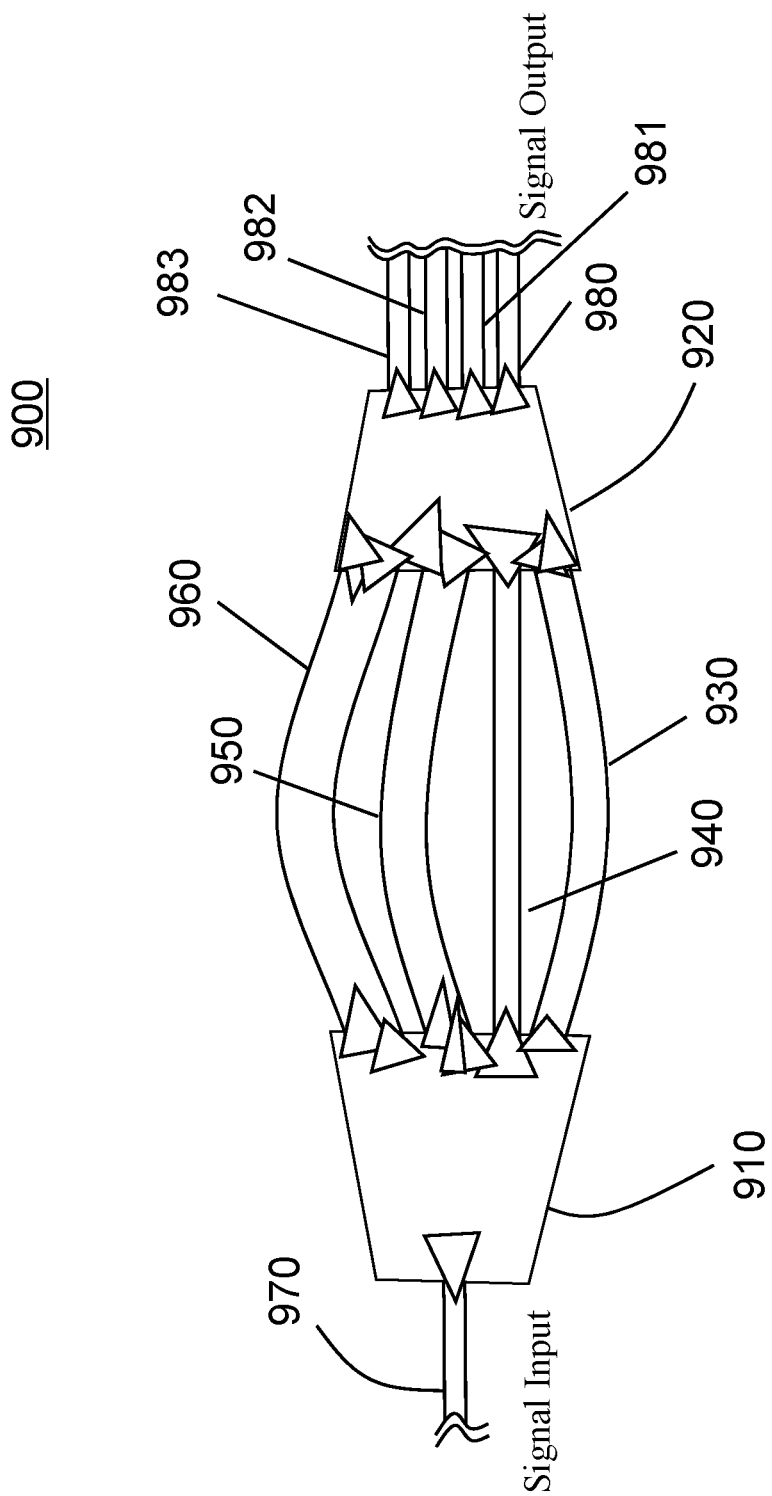
FIG. 9 is an example of an optical waveguide interferometer that includes more than two waveguides with different widths and lengths according to some embodiments.

FIG. 9 shows another embodiment, in which an optical waveguide interferometer 900 includes waveguides with different widths and output ports. There are four waveguides 930, 940, 950 and 960 arranged in the optical interferometer 900. The waveguides 930, 940, 950 and 960 have different lengths L1, L2, L3 and L4, and different widths W1, W2, W3 and W4, respectively. In this case, the lengths L1, L2, L3 and L4 of the waveguides 930, 940, 950 and 960 are arranged to be L2<L1<L3<L4, and the widths of the waveguides 930, 940, 950 and 960 are arranged to be W2<W1<W3<W4. An optical signal is input through an input waveguide 970. The optical signal propagates through an optical branching section 910 and separated into the waveguides 930, 940, 950 and 960. After interfering by passing the waveguides 930, 940, 950 and 960, each interference signal is derived to each of output waveguides 980, 981, 982 and 983 through an optical coupling section 920 according to the system design. In this embodiment, the optical waveguide interferometer 900 may be referred to as an arrayed waveguide 900, the optical branching section 910 may be referred to as a first optical section 910, and the optical coupling section 920 may be referred to as a second optical section 920. In this embodiment, although one input waveguide 970 is shown in this embodiment, multiple input waveguides can be arranged at the optical branching section 910 according to the system design.

Figure 10:
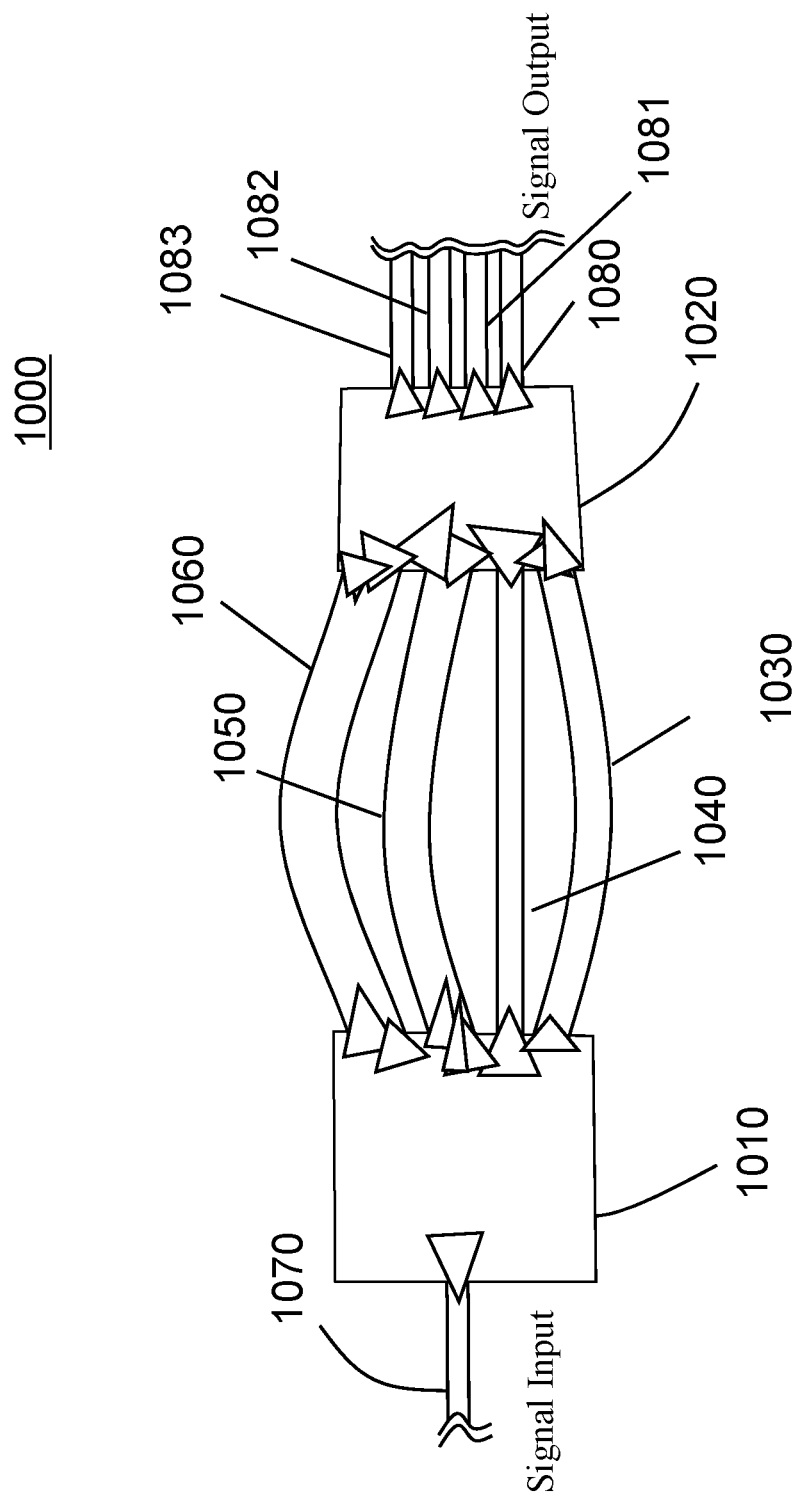
FIG. 10 is an example of an optical waveguide interferometer that includes more than two waveguides with different widths and lengths according to some embodiments.

FIG. 10 shows another embodiment of an optical interferometer according to the invention, in which an optical interferometer 1000 includes waveguides with different widths and output ports. There are four waveguides 1030, 1040, 1050 and 1060 arranged in the optical interferometer 1000. The waveguides 1030, 1040, 1050 and 1060 have different lengths L1, L2, L3 and L4, and different widths W1, W2, W3 and W4, respectively. In this case, the lengths L1, L2, L3 and L4 of the waveguides 1030, 1040, 1050 and 1060 are arranged to be L2<L1<L3<L4, and the widths of the waveguides 1030, 1040, 1050 and 1060 are arranged to be W2<W1<W3<W4. An optical signal is input through an input waveguide 1070. The optical signal propagates through an optical branching section 1010 and separated into the waveguides 1030, 1040, 1050 and 1060. After interfering by passing the waveguides 1030, 1040, 1050 and 1060, each interference signal is derived to each of output waveguides 1080, 1081, 1082 and 1083 through an optical coupling section 1020 according to the system design. Further, the optical branching section 1010 and the optical coupling section 1020 have predetermined rectangular shapes, in which each of the rectangular shapes of the optical branching section 1010 and the optical coupling section 1020 are designed such that losses of the optical signals propagating the optical interferometer 1000 are effectively reduced. In this embodiment, the optical waveguide interferometer 1000 may be referred to as a transversal filter 1000, the optical branching section 1010 may be referred to as a first optical section 1010, and the optical coupling section 1020 may be referred to as a second optical section 1020. In this embodiment, although one input waveguide 1070 is shown, multiple input waveguides may be arranged at the optical branching section 1010 according to the system design. Further, the optical interferometer 1000 may consist of two multimode interference devices.

Although several preferred embodiments have been shown and described, it would be apparent to those skilled in the art that many changes and modifications may be made thereunto without the departing from the scope of the invention, which is defined by the following claims and their equivalents.

We claim:

1. An optical waveguide interferometer, comprising:
   a first optical section;
   a second optical section;
   a set of optical waveguides connecting the first optical section and the second optical section, such that light propagating between the first optical section and the second optical section passes through each optical waveguide in the set,
   wherein each of the optical waveguides consists of a core layer and a cladding layer,
   wherein the set of optical waveguides includes a first optical waveguide having a first length and a first width and a second optical waveguide having a second length and a second width,
   wherein the second length is greater than the first length, and the second width is greater than the first width,
   wherein a product of a first derivative of a first effective refractive index of the first waveguide with respect to the first width and the first length is substantially equal to another product of a second derivative of a second effective refractive index of the second waveguide with respect to the width and the second length, such that a relative phase difference caused between the first and second waveguides is compensated,
   wherein at least one of the optical waveguides includes a curved portion,
   wherein each waveguide width is consistent throughout an entire waveguide.

2. The optical waveguide interferometer of claim 1, wherein the first optical section is a branching section including at least one branch-input port for accepting the light into the branching section and at least two branch-output ports for outputting the light from the branching section, wherein the two branch-output ports includes a first branch-output port connected to the first optical waveguide and a second branch-output port connected to the second optical waveguide, and
   wherein the second optical section is an optical coupling section including at least two coupling-input ports for accepting the light into the coupling section and at least one coupling-output port for outputting the light from the coupling section, wherein the two coupling-input ports includes a first coupling-input port connected to the first optical waveguide and a second coupling-input port connected to the second optical waveguide.

3. The optical waveguide interferometer of claimed in claim 1 wherein an effective refractive index of the first optical waveguide is greater than an effective refractive index of the second optical waveguide.

4. The optical waveguide interferometer of claim 1, wherein when the first length is L1, the second length is L2, a first derivative of the first effective refractive index with respect to the first width is $\Delta n1$, and a first derivative of the second effective refractive index with respect to the second width is $\Delta n2$, and the first width and the second width are determined such that a difference between the product of L1 and $\Delta n1$ and the product of L2 and $\Delta n2$ is less than 10%.

5. The optical waveguide interferometer of claim 1, wherein the first width and the second width are determined such that $L1 \cdot \Delta n1 = \alpha n2$, and $0.9 \leq \alpha \leq 1.1$.

6. The optical waveguide interferometer of claim 1, wherein the optical interferometer is an asymmetric Mach Zehnder interferometer.

7. The optical waveguide interferometer of claim 1, wherein the optical interferometer is an arrayed waveguide grating.

8. The optical waveguide interferometer of claim 1, wherein the optical interferometer consists of two multimode interference devices and more than two interconnecting waveguides.

9. The optical waveguide interferometer of claim 1, the set of optical waveguides includes more than two waveguides, wherein all waveguides in the set have different lengths and different widths selected such that each optical waveguide longer than another waveguide is wider than the other.

10. The optical waveguide interferometer of claim 1, wherein each optical waveguide has a tapered input and a tapered output portion of approximately the same maximal width.

11. The optical waveguide interferometer of claim 10, wherein the input and output portions of the first and second optical sections are configured such that the tapered input and outputs of the waveguides are connected with the tapered input and output portions of the set of optical waveguides.

12. The optical waveguide interferometer of claim 1, wherein at least one of the first and second optical sections has at least one unconnected waveguide.

13. The optical waveguide interferometer of claim 1, wherein at least one of the first and second optical sections has at least one unguided section at each output portion.

14. The optical waveguide interferometer of claimed 13, wherein the segment includes a narrower section having a length being longer than at least 1 μm.

15. The optical waveguide interferometer of claim 1, wherein each of the optical waveguides includes at least one segment being narrower than another segment.

16. The optical waveguide interferometer of claim 1, further comprising:
- a substrate attached to a bottom of the first optical section, the second optical section and the set of waveguides, wherein the substrate includes one or combination of an indium phosphide substrate, a silicon substrate, and a glass substrate.

17. The optical waveguide interferometer of claim 1, wherein the second length is determined by steps of:
- determining a core thickness of the set of optical waveguides for a predetermined wavelength;
- determining the first length and a first width according to a predetermined system design;
- determining an additional length based on a predetermined wavelength separation and an effective refractive index of the first waveguide; and
- determining the second length by adding the first length and the additional length.

\* \* \* \* \*